(12) United States Patent
Zhu et al.

(10) Patent No.: US 11,569,947 B2
(45) Date of Patent: Jan. 31, 2023

(54) METHOD AND APPARATUS FOR MANAGING A RESOURCE IN A WIRELESS COMMUNICATION SYSTEM

(71) Applicant: Telefonaktiebolaget LM Ericsson (publ), Stockholm (SE)

(72) Inventors: Yaqiong Zhu, Beijing (CN); Hong Dong, Beijing (CN); Li Wang, Beijing (CN); Yanda Tong, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 28 days.

(21) Appl. No.: 17/264,837

(22) PCT Filed: Aug. 2, 2018

(86) PCT No.: PCT/CN2018/098246
§ 371 (c)(1),
(2) Date: Jan. 31, 2021

(87) PCT Pub. No.: WO2020/024204
PCT Pub. Date: Feb. 6, 2020

(65) Prior Publication Data
US 2021/0297200 A1    Sep. 23, 2021

(51) Int. Cl.
*H04W 72/00* (2009.01)
*H04L 1/18* (2006.01)
(Continued)

(52) U.S. Cl.
CPC .......... *H04L 1/1896* (2013.01); *H04L 1/1819* (2013.01); *H04W 28/0268* (2013.01); *H04W 28/24* (2013.01)

(58) Field of Classification Search
None
See application file for complete search history.

(56) References Cited

U.S. PATENT DOCUMENTS

2013/0148597 A1* 6/2013 Lee ................... H04W 72/1236
370/329
2014/0343989 A1* 11/2014 Martini ................. H04L 63/104
705/7.17

(Continued)

FOREIGN PATENT DOCUMENTS

| CN | 102291221 A | 12/2011 |
| WO | WO 2007/079058 A2 | 7/2007 |
| WO | WO 2018/082501 A1 | 5/2018 |

OTHER PUBLICATIONS

Extended European Search Report dated Mar. 23, 2022 for European Patent Application No. 18928636.2, 9 pages.
(Continued)

*Primary Examiner* — Brandon M Renner
(74) *Attorney, Agent, or Firm* — Sage Patent Group

(57) ABSTRACT

Various embodiments of the present disclosure provide method and apparatus for managing a resource in a wireless communication system. A method implemented at a network device may comprise allocating, based on respective quality of service, QoS, priority of a plurality of terminal devices, respective automatic repeat request, ARQ, indicator channels for the plurality of terminal devices; transmitting the allocation result to the plurality of terminal devices; and transmitting respective ARQ indicators on the allocated respective ARQ indicator channels to the plurality of terminal devices.

20 Claims, 13 Drawing Sheets

(51) Int. Cl.
*H04W 28/02* (2009.01)
*H04W 28/24* (2009.01)

(56) References Cited

U.S. PATENT DOCUMENTS

| | | | |
|---|---|---|---|
| 2018/0063263 A1* | 3/2018 | Bandela | H04L 67/22 |
| 2018/0139013 A1 | 5/2018 | Sun et al. | |
| 2018/0249484 A1* | 8/2018 | Kim | H04W 74/0808 |
| 2019/0261408 A1 | 8/2019 | Lou et al. | |
| 2020/0099475 A1* | 3/2020 | Amuru | H04L 1/1812 |
| 2021/0126753 A1* | 4/2021 | Mochizuki | H04W 72/1268 |

OTHER PUBLICATIONS

International Search Report and Written Opinion of the International Searching Authority, PCT/CN2018/098246, dated May 5, 2019, 10 pages.

* cited by examiner

METHOD AND APPARATUS FOR MANAGING A RESOURCE IN A WIRELESS COMMUNICATION SYSTEM

CROSS REFERENCE TO RELATED APPLICATIONS

This application is a 35 U.S.C. § 371 national stage application of PCT International Application No. PCT/CN2018/098246 filed on Aug. 2, 2018, the disclosure and content of which is incorporated by reference herein in its entirety.

TECHNICAL FIELD

Embodiments of the disclosure generally relate to wireless communication, and, more particularly, to method and apparatus for managing a resource in a wireless communication system.

BACKGROUND

A Physical HARQ (hybrid automatic repeat request (ARQ)) Indicator Channel (PHICH) in a downlink carries HARQ acknowledgements (ACK/NACK) for uplink data transfers. PHICH may be used to indicate a reception of uplink transmission from a user equipment (UE). The PHICH indicates either an ACK or a NACK, which the UE will decode to find out if it has to do a retransmission or not. Multiple PHICHs transmitted on a control region symbol of a subframe are partitioned in two levels: 1) PHICH group: multiple PHICHs mapped to a same set of resource elements constitute a PHICH group; 2) Code: PHICHs within a same PHICH group are separated through different orthogonal sequences.

In long term evolution (LTE), each PHICH group can carry up to 8 users' PHICH information, as there are 8 Walsh sequences available for normal cyclic prefix. The number of PHICH groups may be a cell level parameter and it may be also transmitted as part of Master Information Block (MIB), so as to assist the UE in getting the control channel mapping. The PHICH group value may be decided based on how much users per subframe would the system want to support in uplink Physical Uplink Shared Channel (PUSCH).

Allocating of a PHICH group index can be realized in a wireless communication system such as LTE by assigning a parameter related demodulation reference signals (DMRS) in a corresponding PDCCH (Physical Downlink Control Channel) uplink grant according to the formula defined in section 9.1.2 of 3rd Generation Partnership Project (3GPP) TS 36.213. A legacy allocation method may allocate a UE to a PHICH group with minimum UEs among the candidate PHICH groups.

SUMMARY

This summary is provided to introduce a selection of concepts in a simplified form that are further described below in detailed description. This summary is not intended to identify key features or essential features of the claimed subject matter, nor is it intended to be used to limit the scope of the claimed subject matter.

According to a first aspect of the disclosure, it is provided a method implemented at a network device. The method may comprise allocating, based on respective quality of service, QoS, priority of a plurality of terminal devices, respective automatic repeat request, ARQ, indicator channels for the plurality of terminal devices; transmitting the allocation result to the plurality of terminal devices; and transmitting respective ARQ indicators on the allocated respective ARQ indicator channels to the plurality of terminal devices.

According to a second aspect of the disclosure, it is provided a method implemented at a terminal device. The method may comprise receiving, from a network device, an allocation result of automatic repeat request, ARQ, indicator channel; and receiving, from the network device, an ARQ indicator on the allocated ARQ indicator channel, wherein the allocation of the ARQ indicator channel is based on quality of service, QoS, priority of the terminal devices.

According to third aspect of the disclosure, it is provided an apparatus implemented in a network device. The apparatus may comprise one or more processors; and one or more memories comprising computer program codes, the one or more memories and the computer program codes configured to, with the one or more processors, cause the apparatus at least to: allocate, based on respective quality of service, QoS, priority of a plurality of terminal devices, respective ARQ indicator channels for the plurality of terminal devices; transmit the allocation result to the plurality of terminal devices; and transmit respective ARQ indicators on the allocated respective ARQ indicator channels to the plurality of terminal devices.

According to a fourth aspect of the disclosure, it is provided an apparatus implemented in a terminal device. The apparatus may comprise one or more processors; and one or more memories comprising computer program codes, the one or more memories and the computer program codes configured to, with the one or more processors, cause the apparatus at least to: receive, from a network device, an allocation result of automatic repeat request, ARQ, indicator channel; and receive, from the network device, an ARQ indicator on the allocated ARQ indicator channel, wherein the allocation of the ARQ indicator channel is based on quality of service, QoS, priority of the terminal devices.

According to a fifth aspect of the disclosure, it is provided a computer-readable medium having computer program codes embodied thereon for use with a computer, wherein the computer program codes comprise codes for performing the method according to the first aspect of the disclosure.

According to a sixth aspect of the disclosure, it is provided a computer-readable medium having computer program codes embodied thereon for use with a computer, wherein the computer program codes comprise codes for performing the method according to the second aspect of the disclosure.

According to a seventh aspect of the disclosure, it is provided a communication system including a host computer comprising a communication interface configured to receive user data originating from a transmission from a user equipment (UE) to a base station. The base station comprises a radio interface and processing circuitry, the base station's processing circuitry configured to perform any of the steps of the method according to the first aspect of the disclosure. The UE comprises a radio interface and processing circuitry, the UE's processing circuitry configured to perform any of the steps of the method according to the second aspect of the disclosure.

According to an eighth aspect of the disclosure, it is provided a method implemented in a communication system including a host computer, a base station and a user equipment (UE). The method may comprise at the host computer, receiving, from the base station, user data originating from a transmission which the base station has received from the UE. The UE performs any of the steps of the method according to according to the second aspect of the disclosure. The base station performs any of the steps of the method according to the first aspect of the disclosure.

According to a ninth aspect of the disclosure, it is provided a network device. The network device may comprise an allocating unit configured to allocate, based on respective quality of service, QoS, priority of a plurality of terminal devices, respective automatic repeat request, ARQ, indicator channels for the plurality of terminal devices. The network device may further comprise a first transmitting unit configured to transmit the allocation result to the plurality of terminal devices; the network device may further comprise a second transmitting unit configured to transmit respective ARQ indicators on the allocated respective ARQ indicator channels to the plurality of terminal devices.

According to a tenth aspect of the disclosure, it is provided a terminal device. The terminal device may comprise a first receiving unit configured to receive, from a network device, an allocation result of automatic repeat request, ARQ, indicator channel; the terminal device may comprise a second receiving unit configured to receive, from the network device, an ARQ indicator on the allocated ARQ indicator channel, wherein the allocation of the ARQ indicator channel is based on quality of service, QoS, priority of the terminal devices.

Some embodiments of the present disclosure may provide a QoS differentiated ARQ indicator channel (such as PHICH) allocation method which can provide efficient usage of ARQ indicator channel (such as PHICH) resources when multiple levels of QoS are required. In addition, from a UE service point of view, ARQ indicator channel (such as PHICH) transmission performances for high priority QoS level UEs may be improved.

These and other objects, features and advantages of the disclosure will become apparent from the following detailed description of illustrative embodiments thereof, which are to be read in connection with the accompanying drawings.

DETAILED DESCRIPTION

Figure 1:
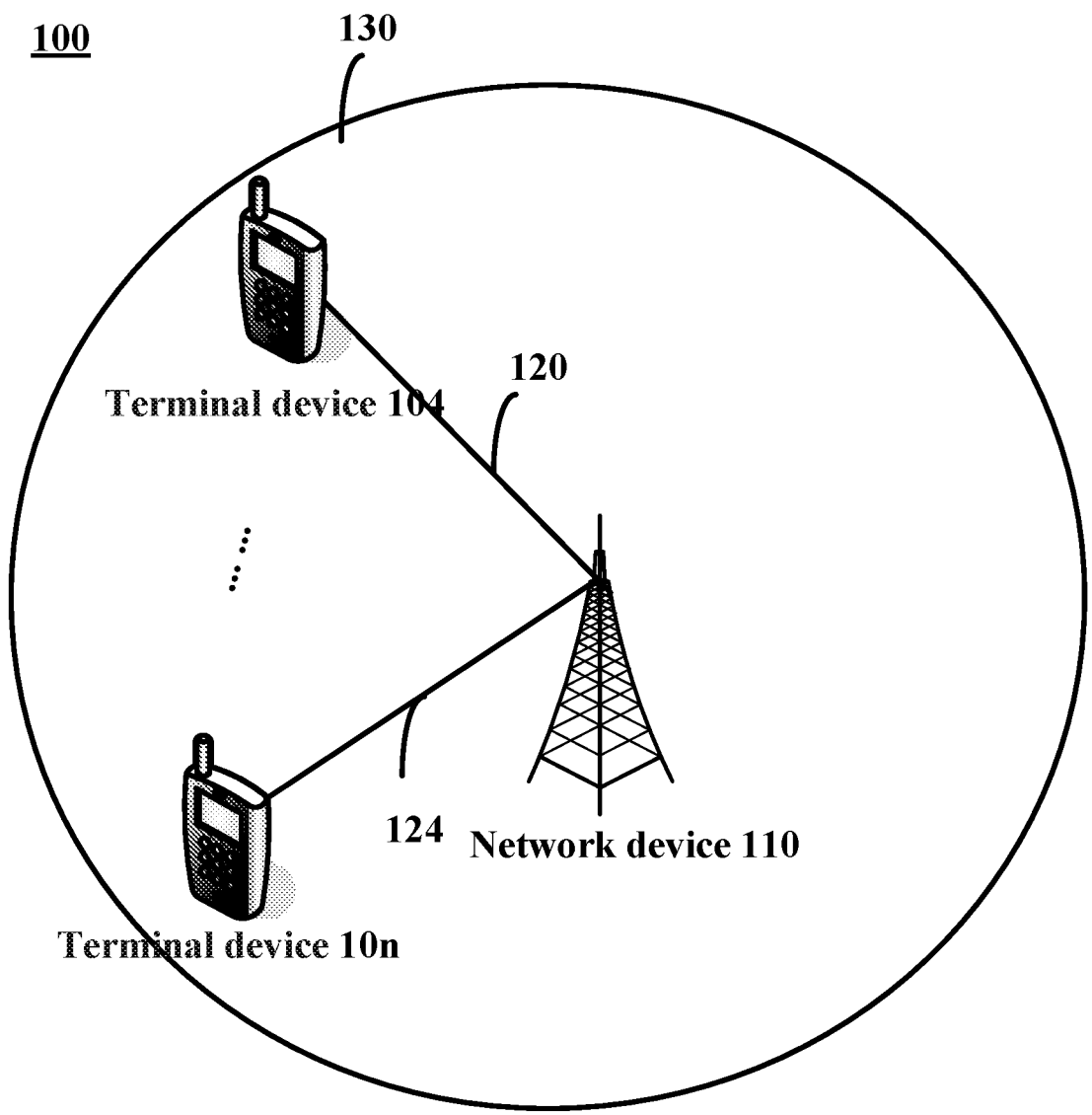
FIG. 1 depicts a schematic communication system, in which some embodiments of the present disclosure can be implemented.

For the purpose of explanation, details are set forth in the following description in order to provide a thorough understanding of the embodiments disclosed. It is apparent, however, to those skilled in the art that the embodiments may be implemented without these specific details or with an equivalent arrangement.

As used herein, the term "wireless system/network" refers to a network following any suitable communication standards, such as LTE-Advanced (LTE-A), LTE, new radio (NR) and so on. Furthermore, the communications between a terminal device and a network device in the wireless network may be performed according to any suitable generation communication protocols, including, but not limited to LTE, fifth generation (5G) communication protocols such as NR, and/or any other protocols either currently known or to be developed in the future.

The term "network device" refers to a device in a wireless network via which a terminal device accesses the network and receives services therefrom. The network device refers a base station (BS), an access point (AP), or any other suitable device in the wireless network. The BS may be, for example, an evolved eNodeB or eNB, or gNB in 5G, a Remote Radio Unit (RRU), a radio header (RH), a remote radio head (RRH), a relay, a low power node such as a femto, a pico, and so forth. More generally, however, the network device may represent any suitable device (or group of devices) capable, configured, arranged, and/or operable to enable and/or provide a terminal device access to the wireless network or to provide some service to a terminal device that has accessed the wireless network.

The term "terminal device" refers to any end device that can access a wireless network and receive services therefrom. By way of example and not limitation, the terminal device refers to a mobile terminal, user equipment (UE), or other suitable devices. The terminal device may be, for example, a Subscriber Station (SS), a Portable Subscriber Station, a Mobile Station (MS), or an Access Terminal (AT). The terminal device may include, but not limited to, portable computers, image capture terminal devices such as digital cameras, gaming terminal devices, music storage and playback appliances, a mobile phone, a cellular phone, a smart phone, voice over IP (VoIP) phones, wireless local loop phones, a tablet, a wearable device, a personal digital assistant (PDA), portable computers, desktop computer, image capture terminal devices such as digital cameras, gaming terminal devices, music storage and playback appliances, wearable terminal devices, vehicle-mounted wireless terminal devices, wireless endpoints, mobile stations, laptop-embedded equipment (LEE), laptop-mounted equipment (LME), USB dongles, smart devices, wireless customer-premises equipment (CPE) and the like. In the following description, the terms "terminal device", "terminal", "user equipment" and "UE" may be used interchangeably. As one example, a terminal device may represent a UE configured for communication in accordance with one or more communication standards promulgated by 3GPP, such as 3GPP's LTE and/or 5G NR standards. As used herein, a "user equipment" or "UE" may not necessarily have a "user" in the sense of a human user who owns and/or operates the relevant device. In some embodiments, a terminal device may be configured to transmit and/or receive information without direct human interaction. For instance, a terminal device may be designed to transmit information to a network on a predetermined schedule, when triggered by an internal or external event, or in response to requests from the wireless network. Instead, a UE may represent a device that is intended for sale to, or operation by, a human user but that may not initially be associated with a specific human user.

As yet another example, in an Internet of Things (IOT) scenario, a terminal device may represent a machine or other device that performs monitoring and/or measurements, and transmits the results of such monitoring and/or measurements to another terminal device and/or network equipment. The terminal device may in this case be a machine-to-machine (M2M) device, which may in a 3GPP context be referred to as a machine-type communication (MTC) device. As one particular example, the terminal device may be a UE implementing the 3GPP narrow band internet of things (NB-IoT) standard. Particular examples of such machines or devices are sensors, metering devices such as power meters, industrial machinery, or home or personal appliances, for example refrigerators, televisions, personal wearables such as watches etc. In other scenarios, a terminal device may represent a vehicle or other equipment that is capable of monitoring and/or reporting on its operational status or other functions associated with its operation.

As used herein, a downlink, DL, transmission refers to a transmission from the network device to a terminal device, and an uplink, UL, transmission refers to a transmission in an opposite direction.

References in the specification to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

In the following description and claims, unless defined otherwise, all technical and scientific terms used herein have the same meaning as commonly understood by one of ordinary skills in the art to which this disclosure belongs.

The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

As described above, the legacy allocation method may allocate a UE to a PHICH group with minimum UEs among the candidate PHICH groups. A problem with this method may be that it does not consider UEs' quality of service (QoS) requirement when performing PHICH allocation, which may lead to mismatch between actual PHICH transmission performance and required PHICH performance according to QoS parameters. Another problem may be that it tries to provide same PHICH performance for all UEs with even distribution of UEs on PHICH groups, but lacks a way of providing differentiated PHICH transmission performances, for example which UE can have guaranteed good PHICH performance and which UE can just have normal PHICH performance.

In order to solve at least one of the above problems or other problems or provide an alternative useful solution, embodiments of the present disclosure provide a QoS differentiated ARQ indicator channel such as PHICH allocation method. The principle of the method is to provide differentiated ARQ indicator channel transmission performance by controlling a number of allocated UEs in an ARQ indicator channel group when performing ARQ indicator channel allocation. If the number of allocated UEs in a ARQ indicator channel group is small, the inter code interference among the UEs in the ARQ indicator channel group is small, and thus the ARQ indicator channel transmission performance on that ARQ indicator channel group improves. The proposed method also considers the UEs' QoS parameters in ARQ indicator channel allocation to make sure high priority UEs get high ARQ indicator channel transmission performance.

In the proposed method, the UEs to transmit ARQ ACK/NACK on ARQ indicator channels may be first grouped into QoS groups according to their QoS priority values. These QoS groups have different allocation priorities. Then the ARQ indicator channels groups are allocated to the QoS groups with considerations on available ARQ indicator channel groups, QoS groups' priorities, and requirements of ARQ indicator channel groups by the QoS groups. The QoS differentiated allocation is then realized by giving different allocation priorities to the QoS groups. For example, when ARQ indicator channel group available is in shortage compared with requirements, the requirement of a high priority QoS group is guaranteed and that of a low priority QoS group is compressed.

It is noted that though the embodiments are mainly described in the context of the LTE system and PHICH allocation, they are not limited to this but can be applied to any suitable wireless system supporting the allocation of ARQ indicator channels. Now some exemplary embodiments of the present disclosure will be described below with reference to the figures.

FIG. 1 depicts a schematic communication system, in which some embodiments of the present disclosure can be implemented. As shown in FIG. 1, the communication system 100 comprises a network device 110 such as a BS. The network device 110 may refer to a function element on the network side as compared to a terminal device or UE. For example, the network device 110 may comprise an eNB, a gNB, a Home gNB, a femto Base Station, a pico BS, or any other node capable to serve terminal devices 104-10n in the system 100. It is well known that a cellular radio system may comprise a network of radio cells each served by a transmitting station, known as a cell site or base transceiver station. The radio network provides wireless communications service for a plurality of transceivers. The network of network devices working in collaboration allows for wireless service which is greater than the radio coverage provided by a single network device. The individual network device may be connected by another network (in many cases a wired network, not shown), which includes additional functionality and in some cases access to other network systems (such as the Internet) or metropolitan area networks (MANs). The circle 130 schematically indicates a coverage range of the network device 110.

As shown in FIG. 1, the communication system 100 may comprise one or more UEs or terminal devices 104-10n, each of which may operably communicate with the network device 110 through a wireless link, such as link 120 and 124. The terminal devices 104-10n can be fixed or moveable. Terminal devices 104-10n may include, but not limited to, cellular telephones, smart phones, and computers, whether desktop, laptop, or otherwise, as well as mobile devices or terminals such as cellular network UEs, machine type communication devices, handheld computers, personal digital assistants (PDAs), wireless sensors, wearable devices, video cameras, set-top boxes, personal media devices, or any combinations of the foregoing, which may be provided with wireless communication functionality and run with any kind of operating system including, but not limited to, Windows, Linux, UNIX, Android, iOS and their variants. The terminal devices 104-10n may also be referred to by those skilled in the art as a mobile station, a subscriber station, a mobile unit, a subscriber unit, a wireless unit, a remote unit, a mobile device, a wireless device, a wireless communications device, a mobile subscriber station, an access terminal, a mobile terminal, a wireless terminal, a remote terminal, a handset, a user agent, a mobile client, or the like. The terminal devices 104-10n is compliant with multiple, different communication protocols that can operate as a multimode device by communicating within the communication system 100.

In addition, though only one network device 110 is shown in FIG. 1, there may be two or more network devices such that some terminal devices are within the coverage range of first network device, some terminal devices are within the coverage range of second network device, and some terminal devices are at the border of the coverage ranges of two or more network devices, and so on. In the latter case, the terminal devices may receive signals from each of the two or more network devices.

Figure 2:
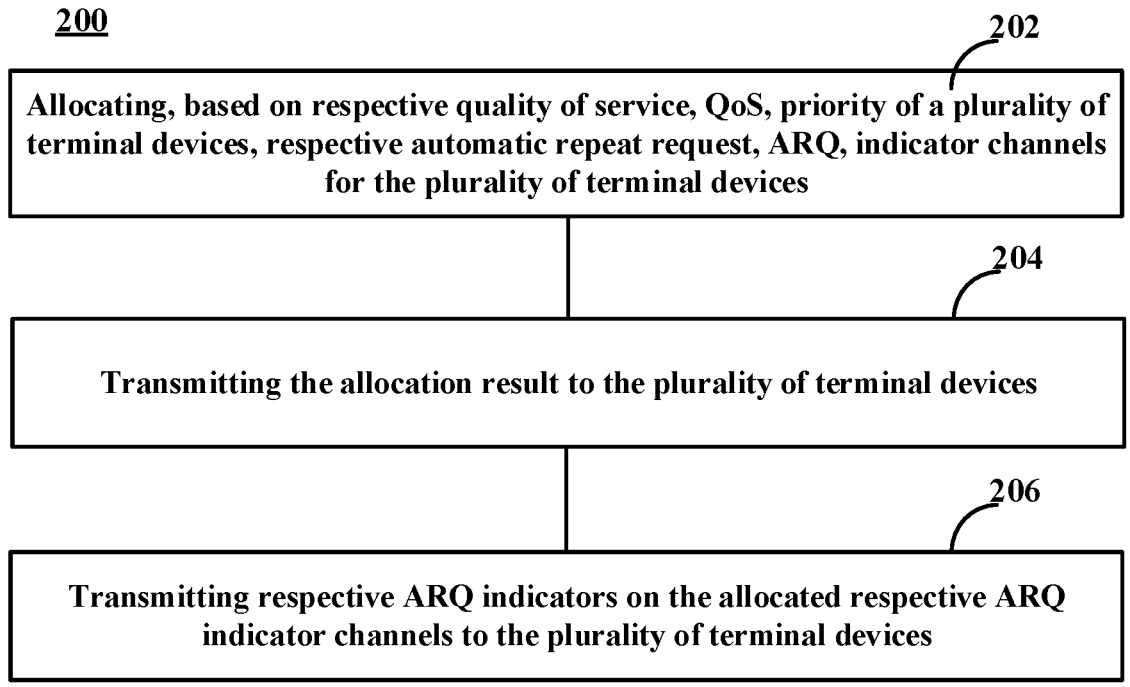
FIG. 2 is a flow chart depicting a method implemented in a network device according to an embodiment of the present disclosure.

FIG. 2 is a flow chart depicting a method implemented in a network device according to an embodiment of the present disclosure, which may be performed at an apparatus such as the network device 110 of FIG. 1. As such, the network device 110 may provide means for accomplishing various parts of the method 200 as well as means for accomplishing other processes in conjunction with other components.

As shown in FIG. 2, the method 200 may comprise allocating, based on respective QoS priority of a plurality of terminal devices, respective automatic repeat request (ARQ) indicator channels for the plurality of terminal devices at block 202; transmitting the allocation result to the plurality of terminal devices at block 204; and transmit respective ARQ indicators on the allocated respective ARQ indicator channels to the plurality of terminal devices at block 206.

At block 202 where the network device 110 may allocate, based on respective QoS priority of a plurality of terminal devices, respective ARQ indicator channels for the plurality of terminal devices.

In some embodiments, the priority may relate to one or more services of terminal device. The priority may be explicitly indicated in a message of the service. In this case, a priority indicator may be included in the message of the service. The network device 110 may obtain the priority from the priority indicator included in the message of the service.

In an embodiment, the QoS priority of a terminal device may be indicated by a QCI. For example, Table 6.1.7 of 3GPP TS 23.203 has defined standardized QCI characteristics. The network device 110 may obtain the respective QoS priority of a plurality of terminal devices from corresponding QCIs.

In an embodiment, when a terminal device is associated with two or more QoS priorities, the highest QoS priority may be used as the QoS priority of the terminal device. In other embodiments, the average QoS priority may be used as the QoS priority of the terminal device.

In an embodiment, a terminal device with a higher QoS priority is allocated with an ARQ indicator channel configured with less number of ARQ indicators. For example, for UEs with a higher QoS priority service, e.g. QCI=1 or 5, the network device 110 may allocate PHICH groups as many as possible to spread the UEs on the allocated PHICH groups. For UE with a lower QoS priority service, e.g. best effort service, the network device 110 may allocate the PHICH groups as few as possible for example when the number of PHICH groups is in shortage. In this way, the UE with a high QoS priority can get a high ARQ indicator channel transmission performance.

In an embodiment, multiple ARQ indicator channels mapped to a same set of resource elements constitute an ARQ indicator channel group, and allocating, based on respective QoS priority of the plurality of terminal devices, respective ARQ indicator channels for the plurality of terminal devices may comprise grouping, based on the respective QoS priority of the plurality of terminal devices, the plurality of terminal devices into two or more QoS groups; determining, based on a number of terminal devices in each QoS group and an expected maximum number of terminal devices in an ARQ indicator channel group for each QoS group, a required total number of ARQ indicator channel groups for the two or more QoS groups; and performing one of the following options:

Option 1: when the required total number of ARQ indicator channel groups is smaller than a number of ARQ indicator channel groups configured to the network device, allocating respective ARQ indicator channel groups for the two or more QoS groups based on the required total number of ARQ indicator channel groups and then allocating first n QoS group(s) in descending order of the QoS priority with surplus ARQ indicator channel group/groups, wherein n is an integer greater than or equal to 1;

Option 2: when the required total number of ARQ indicator channel groups is equal to the number of ARQ indicator channel groups configured to the network device, allocating the ARQ indicator channel groups for the two or more QoS groups based on the required total number of ARQ indicator channel groups;

Option 3: when the required total number of ARQ indicator channel groups is greater than the number of ARQ indicator channel groups configured to the network device, decreasing the required number of ARQ indicator channel groups for first m QoS group/groups in ascending order of the QoS priority such that the required total number of ARQ indicator channel groups is equal to or smaller than the number of ARQ indicator channel groups configured to the network device, and performing option 1 or 2 based on the decreased required total number of ARQ indicator channel groups, wherein m is an integer greater than or equal to 1.

In an embodiment, the expected maximum number of terminal devices in an ARQ indicator channel group for a QoS group with a higher QoS requirement may be set as smaller than the expected maximum number of terminal devices in an ARQ indicator channel group for a QoS group with a lower QoS requirement.

Figure 3:
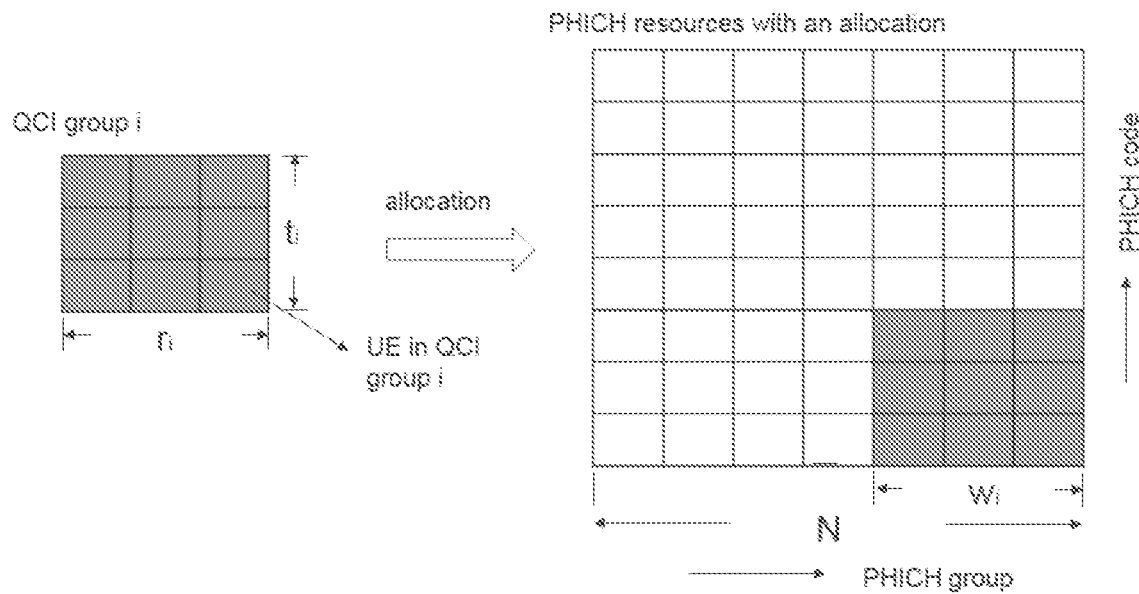
FIG. 3 schematically shows a PHICH allocation.

FIG. 3 schematically shows a PHICH allocation. As shown in FIG. 3, some symbols are defined as below:

QCI group is a group of UEs with a same QCI value
M is the number of QCI groups
N is the number of PHICH groups
$n_i$ is the number of UEs for QCI group with index i.
$t_i$ is the expected maximum UE number in one PHICH group for QCI group with index i.
$r_i$ is the required number of PHICH groups for QCI with index i, $r_i=[n_i/t_i]$
R denotes a sum of for all $r_i$, it means required total number of PHICH groups, $R=\Sigma_{i=1}^{M} r_i$
$w_i$ denotes the finally allocated number of PHICH groups for QCI with index i.

As shown in FIG. 3, eight PHICHs mapped to a same set of resource elements such as time and frequency resources constitute a PHICH group. In other embodiments, the number of PHICHs mapped to the same set of resource elements may be different. PHICHs within the same PHICH group may be separated through different PHICH code such as orthogonal sequences. The expected maximum UE number in one PHICH group for QCI group with a specific index may be predefined or adjusted dynamically for example based on the number of UEs.

Figure 4:
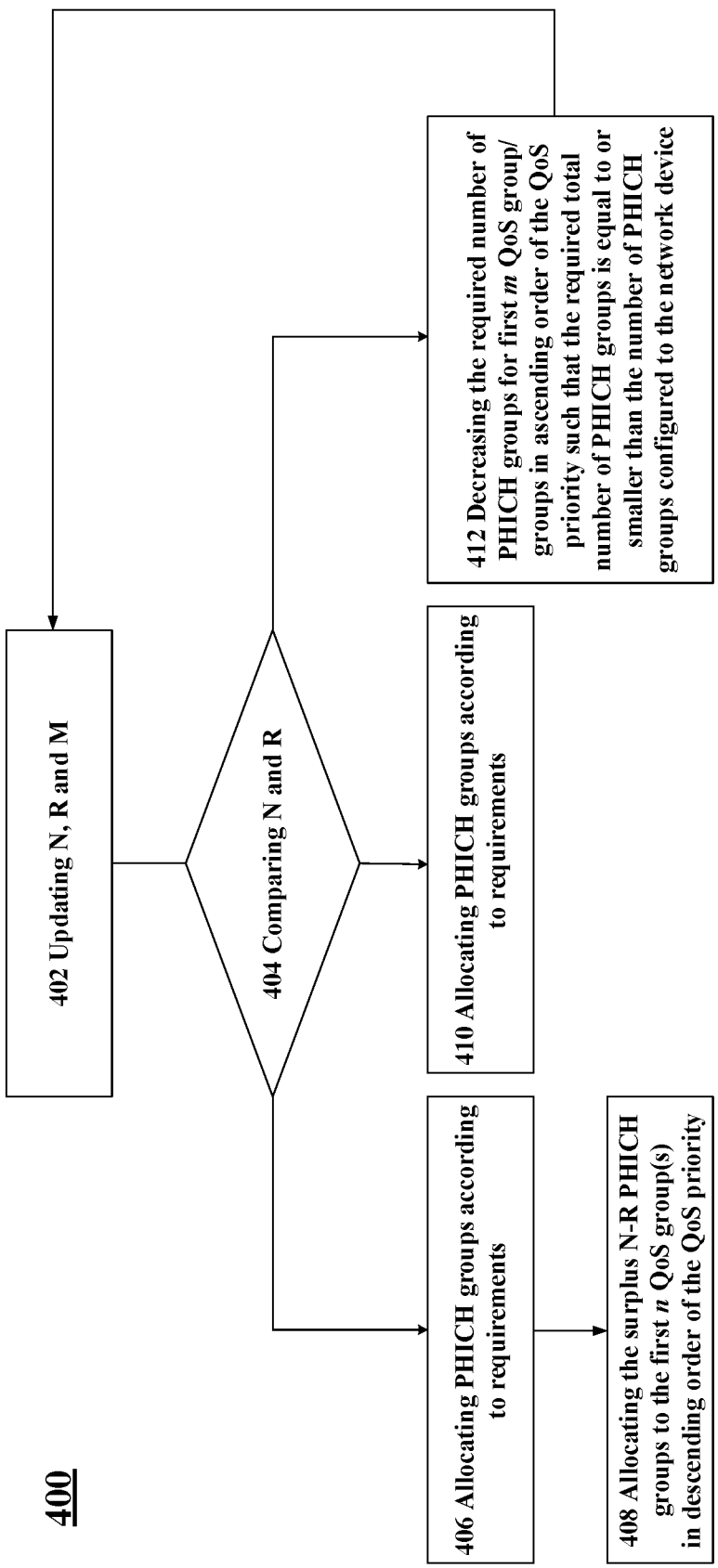
FIG. 4 shows a method of QoS based PHICH allocation according to an embodiment of the disclosure.

FIG. 4 shows a method 400 of QoS based PHICH allocation according to an embodiment of the disclosure. As shown in FIG. 4, at block 402, the network device may update N, M and R. For example, the network device may group, based on the respective QoS priority of the plurality of terminal devices such as QCI value, the plurality of terminal devices into two or more QoS groups such as QCI groups. Then the network device may obtain/update the number of QCI groups, i.e., M. The network device may obtain/update the number of PHICH groups, i.e., N, based on a setting parameter of PHICH resources. Parameter R can be obtained/updated according to $R=\Sigma_{i=1}^{M} r_i$.

At block 404, the network device may compare N and R. When N is greater than R, the network device may allocate PHICH groups according to requirements, i.e., $W_i=R_i$ at block 406. Then the network device may allocate the surplus N−R PHICH groups to the first n QoS group(s) in descending order of the QoS priority at block 408, where n is an integer greater than or equal to 1. Parameter n may be preconfigured or determined dynamically for example according to a threshold for the QoS priority. In an embodiment, the network device may allocate the surplus N−R PHICH groups to the highest priority group. When parameter n is greater than 1, the surplus N−R PHICH groups may be evenly allocated to the first n QoS groups. Alternatively the surplus N−R PHICH groups may be allocated to the first n QoS groups based on the priority of the first n QoS groups, such that a QoS group with higher priority may be allocated with more PHICH groups.

Figure 5:
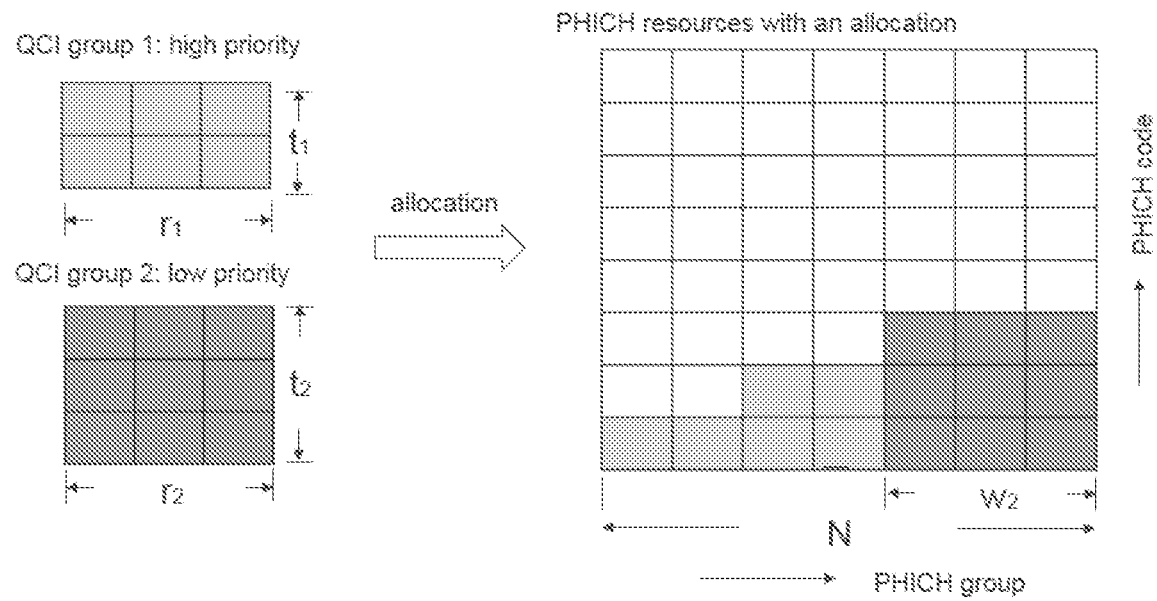
FIG. 5 shows an example of QoS based PHICH allocation according to an embodiment of disclosure.

FIG. 5 shows an example of QoS based PHICH allocation according to an embodiment of disclosure. As shown in FIG. 5, there are two QCI groups (i.e., M=2) and 7 PHICH groups (i.e., N=7), wherein QCI group 1 is with high priority and QCI group 2 is with low priority. The required total number of PHICH groups is 6 (i.e., $R=r_1+r_2=6$). The number of UEs for QCI group index 1 is 6 and the number of UEs for QCI group index 2 is 9. The expected maximum UE number in one PHICH group for QCI group with index 1 is 2 and the expected maximum UE number in one PHICH group for QCI group with index 2 is 3. The required number of PHICH groups for QCI with index 1 is 3 and the required number of PHICH groups for QCI with index 2 is 3. When the network device determines that R is smaller than N, it may allocate respective PHICH groups for the two or more QCI groups based on the required total number of PHICH groups, i.e., $w_1=r_1=3$, $w_2=r_2=3$. Then the number of remaining unallocated PHICH group is N−R=1, and the remaining unallocated PHICH group may be allocated to the QCI group 1 with high priority. Therefore, QCI group 1 is allocated with 4 PHICH groups and QCI group 2 is allocated with 3 PHICH groups. The UEs within a QCI group may be evenly distributed on the one or more PHICH groups allocated to the QCI group.

Turn to FIG. 4, when N is equal to R, the network device may allocate PHICH groups according to the required total number of PHICH groups, i.e., $W_i=R_i$, at block 410.

Figure 6:
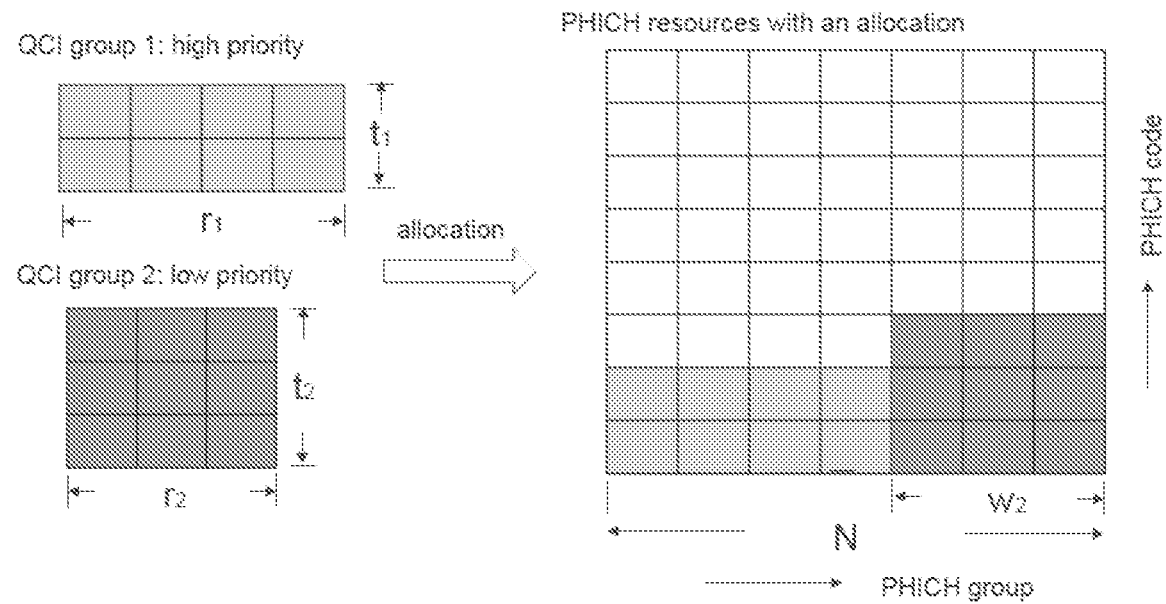
FIG. 6 shows an example of QoS based PHICH allocation according to another embodiment of disclosure.

FIG. 6 shows an example of QoS based PHICH allocation according to another embodiment of disclosure. As shown in FIG. 6, there are two QCI groups (i.e., M=2) and 7 PHICH groups (i.e., N=7), wherein QCI group 1 is with high priority and QCI group 2 is with low priority. The required total number of PHICH groups is 7 (i.e., $R=r_1+r_2=7$). The number of UEs for QCI group index 1 is 8 and the number of UEs for QCI group index 2 is 9. The expected maximum UE number in one PHICH group for QCI group with index 1 is 2 and the expected maximum UE number in one PHICH group for QCI group with index 2 is 3. The required number of PHICH groups for QCI with index 1 is 4 and the required number of PHICH groups for QCI with index 2 is 3. The QoS based allocation procedure may be as following. The network device may determine that R is equal to N, and then allocate respective PHICH groups for the two or more QCI groups based on the required total number of PHICH groups, i.e., $w_1=r_1=4$, $w_2=r_2=3$. As described above, the UEs within each QCI group may be evenly distributed on the one or more PHICH groups allocated to the QCI group.

With reference to FIG. 4, when N is smaller than R, the network device may decrease the required number of PHICH groups for first m QoS group/groups in ascending order of the QoS priority such that the required total number of PHICH groups is equal to or smaller than the number of PHICH groups configured to the network device at block 412, where m is an integer greater than or equal to 1. Parameter m may be preconfigured or determined dynamically for example according to a threshold for the QoS priority. Then the method 400 may go to block 402.

The network may decrease the required number of PHICH for first m QoS group/groups in ascending order of the QoS priority in various ways. In an embodiment, the network device may increase the expected maximum number of terminal devices in a PHICH group for at least one of the first m QoS group/groups in ascending order of the QoS priority. Alternatively, the network device may directly decrease the required number of PHICH groups for the first m QoS group/groups in ascending order of the QoS priority.

Figure 7:
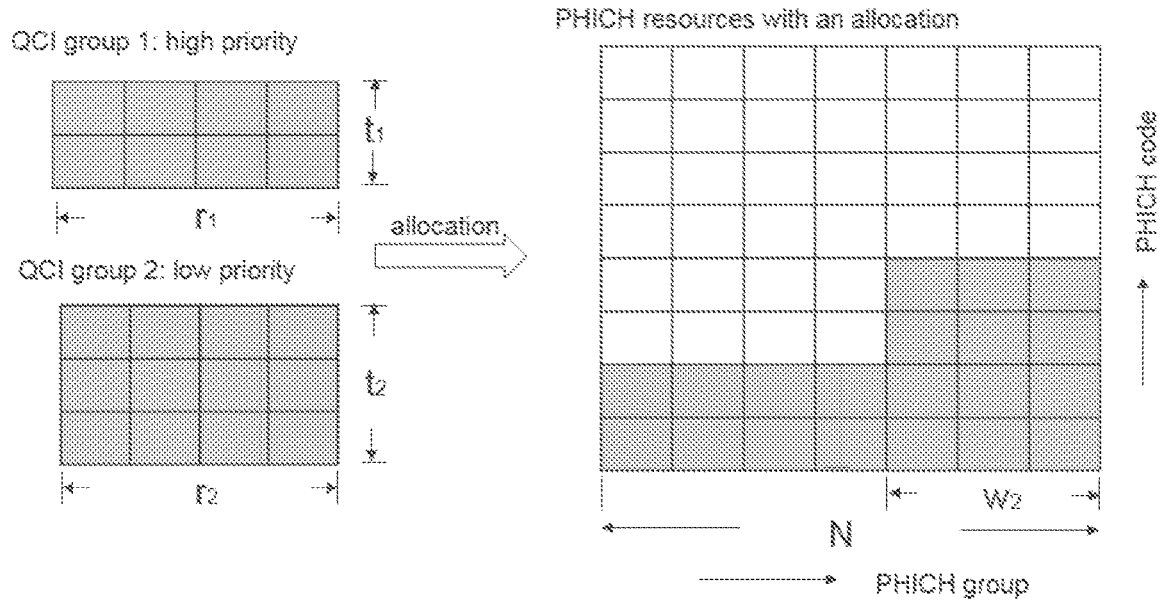
FIG. 7 shows an example of QoS based PHICH allocation according to another embodiment of disclosure.

FIG. 7 shows an example of QoS based PHICH allocation according to another embodiment of disclosure. As shown in FIG. 7, there are two QCI groups (i.e., M=2) and 7 PHICH groups (i.e., N=7), wherein QCI group 1 is with high priority and QCI group 2 is with low priority. The required total number of PHICH groups is 8 (i.e., R=$r_1$+$r_2$=8). The number of UEs for QCI group index 1 is 8 and the number of UEs for QCI group index 2 is 12. The expected maximum UE number in one PHICH group for QCI group with index 1 is 2 and the expected maximum UE number in one PHICH group for QCI group with index 2 is 3. The required number of PHICH groups for QCI with index 1 is 4 and the required number of PHICH groups for QCI with index 2 is 4. The QoS based allocation procedure may be as following. The network device may determine that R is greater than N, and then decrease the required number of PHICH group for QCI group 2. In an embodiment, the network device may decrease the required number of PHICH groups for QCI group 2 as 3. In this case, N is equal to R, then the network device may allocate 4 PHICH groups for the QCI group 4 and allocate 3 PHICH groups for the QCI group 2. In another embodiment, the network device may decrease the required number of PHICH groups for QCI group 2 as 2 such that N is greater than R. In this case, the network device may perform the operations as described in blocks 406 and 408.

In an embodiment, a started allocation ARQ indicator channel group is randomly selected. In this way, it can avoid interference from other cells.

In an embodiment, the ARQ indicator channel may be a PHICH and the ARQ indicator channel group may be a PHICH group.

With reference to FIG. 2, at block 204, the network device may transmit the allocation result to the plurality of terminal devices. For example, the PHICH resource may be identified by an index pair ($n_{PHICH}^{group}$, $n_{PHICH}^{seq}$) where $n_{PHICH}^{group}$ is the PHICH group number and $n_{PHICH}^{seq}$ is the orthogonal sequence index within the group as defined in section 9.1.2 of 3GPP TS 36.213. In other wireless communication system, there may be any other suitable approach to transmit the allocation result to the plurality of terminal devices.

At block 206, the network device may transmit respective ARQ indicators on the allocated respective ARQ indicator channels to the plurality of terminal devices. The ARQ indicator channel such as PHICH may indicate either an ACK or a NACK, which the UE will decode to find out if it has to do a retransmission or not.

Figure 8:
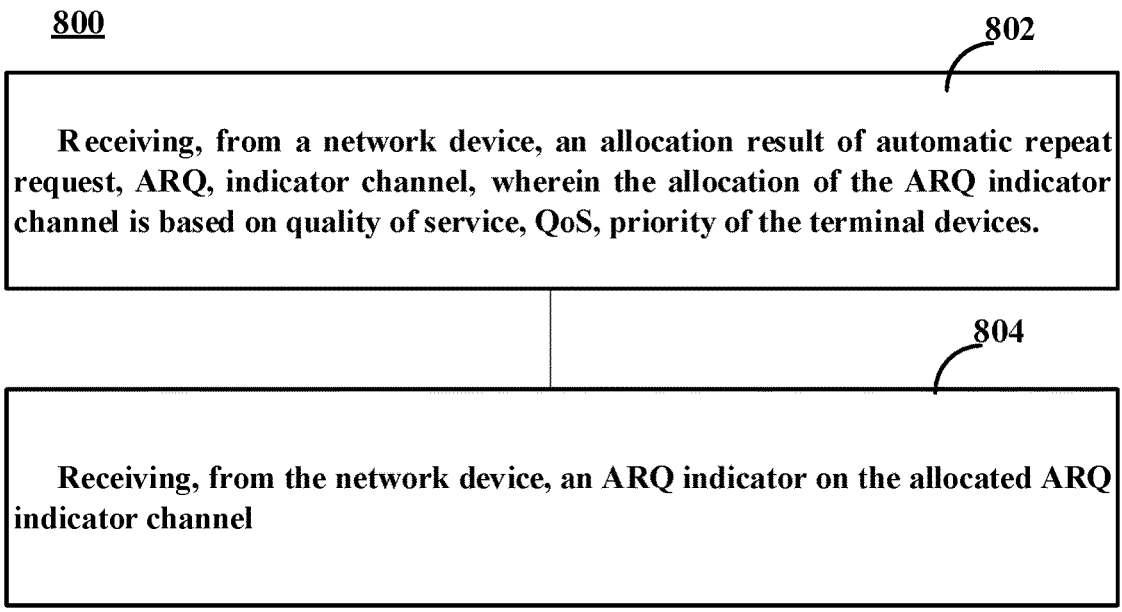
FIG. 8 is a flow chart depicting a method according to an embodiment of the present disclosure.

FIG. 8 is a flow chart depicting a method according to an embodiment of the present disclosure, which may be performed at an apparatus such as the terminal device 102 of FIG. 1. As such, the terminal device may provide means for accomplishing various parts of the method 800 as well as means for accomplishing other processes in conjunction with other components. For some parts which have been described in the above embodiments, detailed description thereof is omitted here for brevity.

As shown in FIG. 8, the method 800 may start at block 802 where the terminal device 102 may receive, from a network device, an allocation result of ARQ indicator channel. For example, the network device 110 may allocate, based on respective QoS priority of a plurality of terminal devices, respective ARQ indicator channels for the plurality of terminal devices and transmit the allocation result to the plurality of terminal devices, and then the terminal device 102 may receive, from the network device, its allocation result of ARQ indicator channel. The allocation of the ARQ indicator channel may be based on QoS priority of the terminal devices as described with reference to the embodiments above.

At block 804, the terminal device 102 may receive, from the network device, an ARQ indicator on the allocated ARQ indicator channel. For example, the network device 110 may transmit respective ARQ indicators on the allocated respective ARQ indicator channels to the plurality of terminal devices, and then the terminal device 102 may receive, from the network device, its ARQ indicator on its allocated ARQ indicator channel. The ARQ indicator channel such as PHICH may indicate either an ACK or a NACK, which the UE will decode to find out if it has to do a retransmission or not.

In an embodiment, the QoS priority of the terminal device may be indicated by a QoS class identifier.

In an embodiment, when the terminal device is associated with two or more QoS priorities, the highest QoS priority is used as the QoS priority of the terminal device.

In an embodiment, the ARQ indicator channel is a physical hybrid ARQ indicator channel, PHICH, and the ARQ indicator channel group is a PHICH group.

Figure 9:
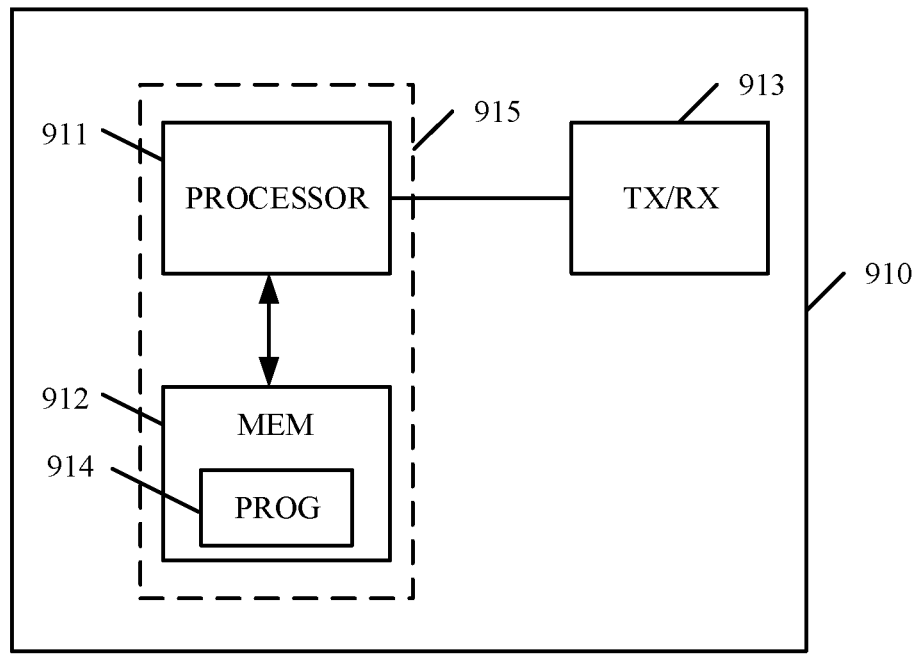
FIG. 9 illustrates a simplified block diagram of a network device according to an embodiment of the present disclosure.

FIG. 9 illustrates a simplified block diagram of a network device according to an embodiment of the present disclosure. The network device 900 may comprise at least one processor 911, such as a data processor (DP) and at least one memory (MEM) 912 coupled to the processor 911. The network device 900 may further comprise a transmitter TX and receiver RX 913 coupled to the processor 911. The MEM 912 stores a program (PROG) 914. The PROG 914 may include instructions that, when executed on the associated processor 911, enable the network device 900 to operate in accordance with the embodiments of the present disclosure, for example to perform the method 200. A combination of the at least one processor 911 and the at least one MEM 912 may form processing means 915 adapted to implement various embodiments of the present disclosure.

Figure 10:
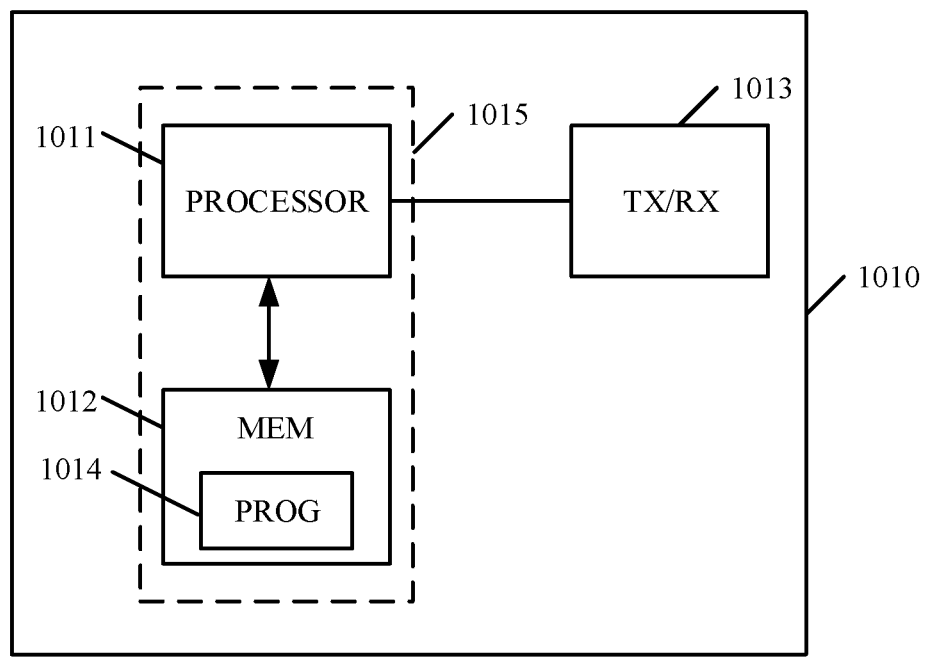
FIG. 10 illustrates a simplified block diagram of a terminal device according to an embodiment of the present disclosure.

FIG. 10 illustrates a simplified block diagram of a terminal device according to an embodiment of the present disclosure. The terminal device 1000 comprises at least one processor 1021, such as a DP, and at least one MEM 1022 coupled to the processor 1021. The terminal device 1000 may further comprise a transmitter TX and receiver RX 1023 coupled to the processor 1021. The MEM 1022 stores a PROG 1024. The PROG 1024 may include instructions that, when executed on the associated processor 1021, enable the terminal device 1000 to operate in accordance with the embodiments of the present disclosure, for example to perform the method 800. A combination of the at least one processor 1021 and the at least one MEM 1022 may form processing means 1025 adapted to implement various embodiments of the present disclosure.

Various embodiments of the present disclosure may be implemented by computer program executable by one or more of the processors 911 and 1021, software, firmware, hardware or in a combination thereof.

The MEMs 912 and 1022 may be of any type suitable to the local technical environment and may be implemented using any suitable data storage technology, such as semiconductor based memory devices, magnetic memory devices and systems, optical memory devices and systems, fixed memory and removable memory, as non-limiting examples.

The processors 911 and 1021 may be of any type suitable to the local technical environment, and may include one or more of general purpose computers, special purpose computers, microprocessors, digital signal processors DSPs and processors based on multicore processor architecture, as non-limiting examples.

Figure 11:
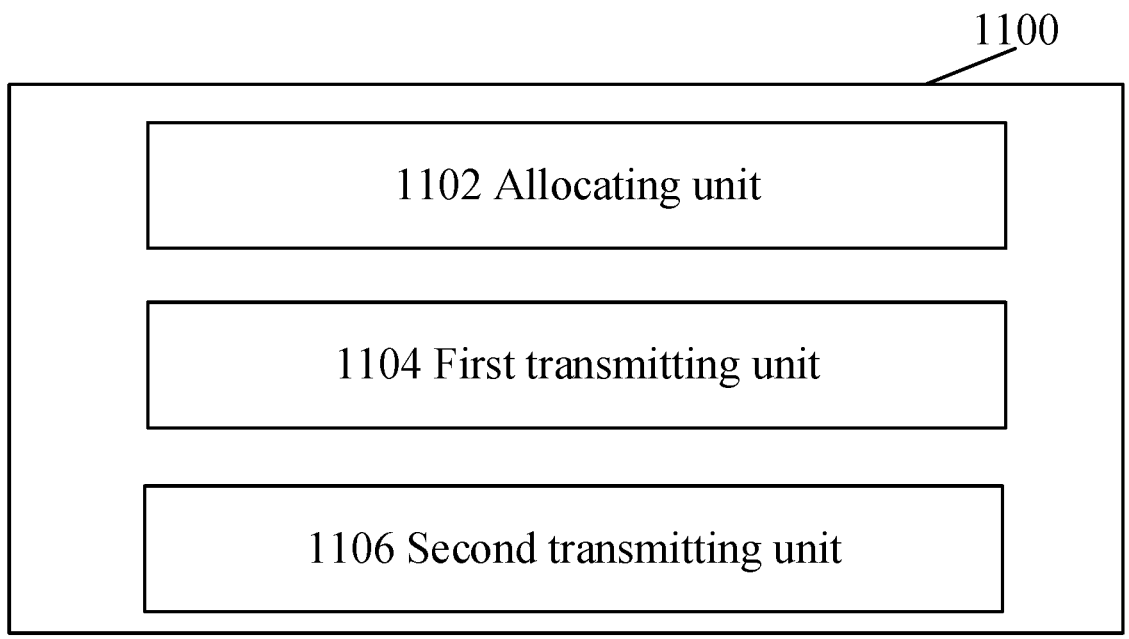
FIG. 11 illustrates a simplified block diagram of a network device according to another embodiment of the present disclosure.

Reference is now made to FIG. 11, which illustrates a schematic block diagram of a network device. The network device 1100 is operable to carry out the exemplary method 200 described with reference to FIG. 2 and possibly any other processes or methods.

As shown in FIG. 11, the network device 1100 may comprise an allocating unit 1102 configured to allocate, based on respective quality of service, QoS, priority of a plurality of terminal devices, respective automatic repeat request, ARQ, indicator channels for the plurality of terminal devices. The network device 1100 may further comprise a first transmitting unit 1104 configured to transmit the allocation result to the plurality of terminal devices. The network device 1100 may further comprise a second transmitting unit 1106 configured to transmit respective ARQ indicators on the allocated respective ARQ indicator channels to the plurality of terminal devices.

In an embodiment, a terminal device with a higher QoS priority is allocated with an ARQ indicator channel configured with less number of ARQ indicators.

In an embodiment, multiple ARQ indicator channels mapped to a same set of resource elements constitute an ARQ indicator channel group, the allocating unit 1102 may be configured to group, based on the respective QoS priority of the plurality of terminal devices, the plurality of terminal devices into two or more QoS groups; determine, based on a number of terminal devices in each QoS group and an expected maximum number of terminal devices in an ARQ indicator channel group for each QoS group, a required total number of ARQ indicator channel groups for the two or more QoS groups; and perform one of option 1: when the required total number of ARQ indicator channel groups is smaller than a number of ARQ indicator channel groups configured to the network device, allocating respective ARQ indicator channel groups for the two or more QoS groups based on the required total number of ARQ indicator channel groups and then allocating first n QoS group(s) in descending order of the QoS priority with surplus ARQ indicator channel group/groups, wherein n is an integer greater than or equal to 1;

option 2: when the required total number of ARQ indicator channel groups is equal to the number of ARQ indicator channel groups configured to the network device, allocating the ARQ indicator channel groups for the two or more QoS groups based on the required total number of ARQ indicator channel groups;

option 3: when the required total number of ARQ indicator channel groups is greater than the number of ARQ indicator channel groups configured to the network device, decreasing the required number of ARQ indicator channel groups for first m QoS group/groups in ascending order of the QoS priority such that the required total number of ARQ indicator channel groups is equal to or smaller than the number of ARQ indicator channel groups configured to the network device, and performing option 1 or 2 based on the decreased required total number of ARQ indicator channel groups, wherein m is an integer greater than or equal to 1.

In an embodiment, decreasing the required number of ARQ indicator channel groups for first m QoS group/groups in ascending order of the QoS priority comprises: increasing the expected maximum number of terminal devices in an ARQ indicator channel group for at least one of the first m QoS group/groups in ascending order of the QoS priority.

In an embodiment, the expected maximum number of terminal devices in an ARQ indicator channel group for a QoS group with a higher QoS requirement is smaller than the expected maximum number of terminal devices in an ARQ indicator channel group for a QoS group with a lower QoS requirement.

In an embodiment, the QoS priority of a terminal device is indicated by a QoS class identifier.

In an embodiment, when a terminal device is associated with two or more QoS priorities, the highest QoS priority is used as the QoS priority of the terminal device.

In an embodiment, a started allocation ARQ indicator channel group is randomly selected.

In an embodiment, the ARQ indicator channel is a physical hybrid ARQ indicator channel, PHICH, and the ARQ indicator channel group is a PHICH group.

Figure 12:
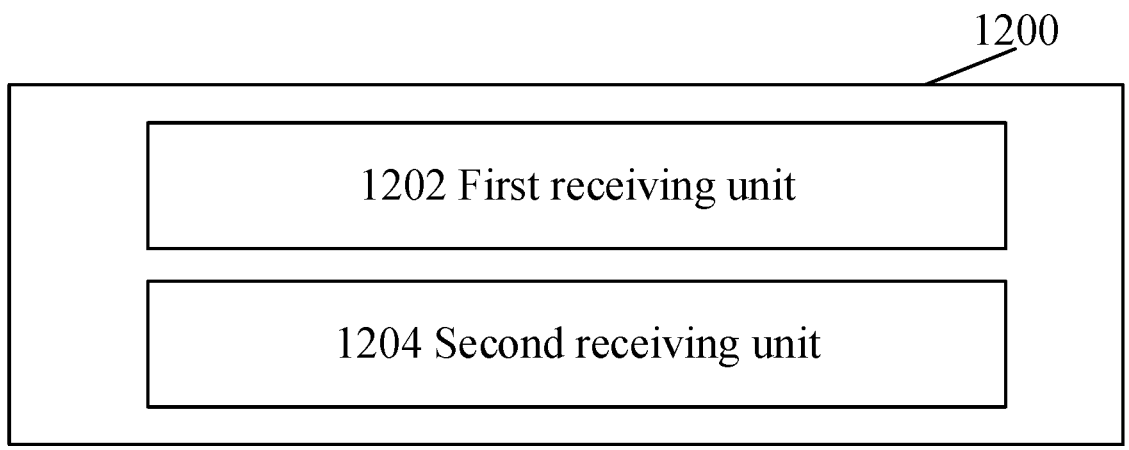
FIG. 12 illustrates a simplified block diagram of a terminal device according to another embodiment of the present disclosure.

Reference is now made to FIG. 12, which illustrates a schematic block diagram of a terminal device. The network device 1200 is operable to carry out the exemplary method 800 described with reference to FIG. 8 and possibly any other processes or methods.

As shown in FIG. 12, the terminal device 1200 may comprise a first receiving unit 1202 configured to receive, from a network device, an allocation result of automatic repeat request, ARQ, indicator channel, wherein the allocation of the ARQ indicator channel is based on quality of service, QoS, priority of the terminal devices. The terminal device 1200 may further comprise a second receiving unit 1204 configured to receive, from the network device, an ARQ indicator on the allocated ARQ indicator channel.

In an embodiment, the QoS priority of the terminal device is indicated by a QoS class identifier.

In an embodiment, when the terminal device is associated with two or more QoS priorities, the highest QoS priority is used as the QoS priority of the terminal device.

In an embodiment, the ARQ indicator channel is a physical hybrid ARQ indicator channel, PHICH, and the ARQ indicator channel group is a PHICH group.

It would be appreciated that, some units or modules in the network device 1100 and terminal device 1200 can be combined in some implementations.

According to an aspect of the disclosure it is provided a computer program product being tangibly stored on a computer readable storage medium and including instructions which, when executed on at least one processor, cause the at least one processor to carry out the method related to the network device as described above, such as the method 200 and a part of method 200.

According to an aspect of the disclosure it is provided a computer program product being tangibly stored on a computer readable storage medium and including instructions which, when executed on at least one processor, cause the at least one processor to carry out the method related to the terminal device as described above, such as the method 800 and a part of method 800.

Figure 13:
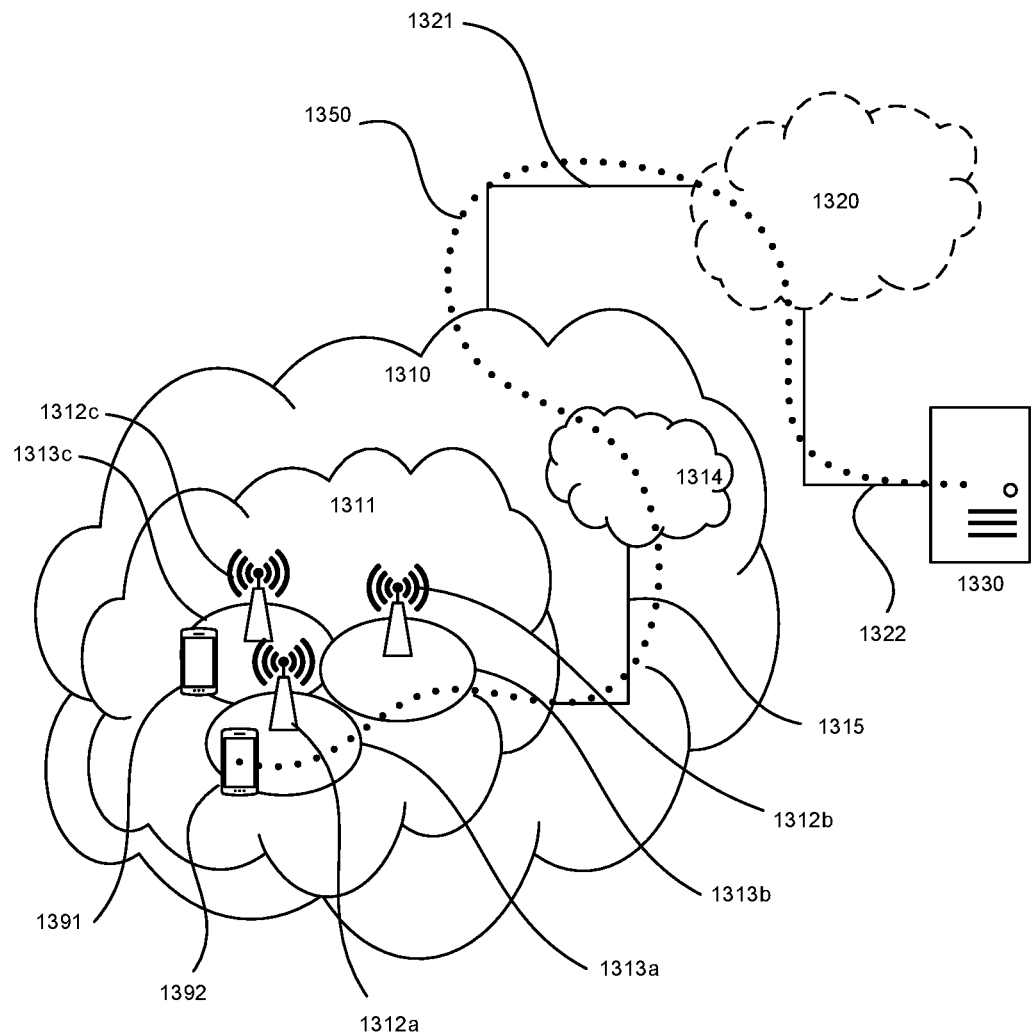
FIG. 13 is a block diagram illustrating a telecommunication network connected via an intermediate network to a host computer in accordance with some embodiments of the present disclosure.

With reference to FIG. 13, in accordance with an embodiment, a communication system includes telecommunication network 1310, such as a 3GPP-type cellular network, which comprises access network 1311, such as a radio access network, and core network 1314. Access network 1311 comprises a plurality of base stations 1312*a*, 1312*b*, 1312*c*, such as NB s, eNBs, gNBs or other types of wireless access points, each defining a corresponding coverage area 1313*a*, 1313*b*, 1313*c*. Each base station 1312*a*, 1312*b*, 1312*c* is connectable to core network 1314 over a wired or wireless connection 1315. A first UE 1391 located in coverage area 1313*c* is configured to wirelessly connect to, or be paged by, the corresponding base station 1312*c*. A second UE 1392 in coverage area 1313*a* is wirelessly connectable to the corresponding base station 1312*a*. While a plurality of UEs 1391, 1392 are illustrated in this example, the disclosed embodiments are equally applicable to a situation where a sole UE is in the coverage area or where a sole UE is connecting to the corresponding base station 1312.

Telecommunication network 1310 is itself connected to host computer 1330, which may be embodied in the hardware and/or software of a standalone server, a cloud-implemented server, a distributed server or as processing resources in a server farm. Host computer 1330 may be under the ownership or control of a service provider, or may be operated by the service provider or on behalf of the service provider. Connections 1321 and 1322 between telecommunication network 1313 and host computer 1330 may extend directly from core network 1314 to host computer 1330 or may go via an optional intermediate network 1320. Intermediate network 1320 may be one of, or a combination of more than one of, a public, private or hosted network; intermediate network 1320, if any, may be a backbone network or the Internet; in particular, intermediate network 1320 may comprise two or more sub-networks (not shown).

The communication system of FIG. 13 as a whole enables connectivity between the connected UEs 1391, 1392 and host computer 1330. The connectivity may be described as an over-the-top (OTT) connection 1350. Host computer 1330 and the connected UEs 1391, 1392 are configured to communicate data and/or signaling via OTT connection 1350, using access network 1311, core network 1314, any intermediate network 1320 and possible further infrastructure (not shown) as intermediaries. OTT connection 1350 may be transparent in the sense that the participating communication devices through which OTT connection 1350 passes are unaware of routing of uplink and downlink communications. For example, base station 1312 may not or need not be informed about the past routing of an incoming downlink communication with data originating from host computer 1330 to be forwarded (e.g., handed over) to a connected UE 1391. Similarly, base station 1312 need not be aware of the future routing of an outgoing uplink communication originating from the UE 1391 towards the host computer 1330.

Example implementations, in accordance with an embodiment, of the UE, base station and host computer discussed in the preceding paragraphs will now be described with reference to FIG. 14. In communication system 1400, host computer 1410 comprises hardware 1415 including communication interface 1416 configured to set up and maintain a wired or wireless connection with an interface of a different communication device of communication system 1400. Host computer 1410 further comprises processing circuitry 1418, which may have storage and/or processing capabilities. In particular, processing circuitry 1418 may comprise one or more programmable processors, application-specific integrated circuits, field programmable gate arrays or combinations of these (not shown) adapted to execute instructions. Host computer 1410 further comprises software 1411, which is stored in or accessible by host computer 1410 and executable by processing circuitry 1418. Software 1411 includes host application 1412. Host application 1412 may be operable to provide a service to a remote user, such as UE 1430 connecting via OTT connection 1450 terminating at UE 1430 and host computer 1410. In providing the service to the remote user, host application 1412 may provide user data which is transmitted using OTT connection 1450.

Communication system 1400 further includes base station 1420 provided in a telecommunication system and comprising hardware 1425 enabling it to communicate with host computer 1410 and with UE 1430. Hardware 1425 may include communication interface 1426 for setting up and maintaining a wired or wireless connection with an interface of a different communication device of communication system 1400, as well as radio interface 1427 for setting up and maintaining at least wireless connection 1470 with UE 1430 located in a coverage area (not shown in FIG. 14) served by base station 1420. Communication interface 1426 may be configured to facilitate connection 1460 to host computer 1410. Connection 1460 may be direct or it may pass through a core network (not shown in FIG. 14) of the telecommunication system and/or through one or more intermediate networks outside the telecommunication system. In the embodiment shown, hardware 1425 of base station 1420 further includes processing circuitry 1428, which may comprise one or more programmable processors, application-specific integrated circuits, field programmable gate arrays or combinations of these (not shown) adapted to execute instructions. Base station 1420 further has software 1421 stored internally or accessible via an external connection.

Communication system 1400 further includes UE 1430 already referred to. Its hardware 1435 may include radio interface 1437 configured to set up and maintain wireless connection 1470 with a base station serving a coverage area in which UE 1230 is currently located. Hardware 1435 of UE 1430 further includes processing circuitry 1438, which may comprise one or more programmable processors, application-specific integrated circuits, field programmable gate arrays or combinations of these (not shown) adapted to execute instructions. UE 1430 further comprises software 1431, which is stored in or accessible by UE 1430 and executable by processing circuitry 1438. Software 1431 includes client application 1432. Client application 1432 may be operable to provide a service to a human or non-human user via UE 1430, with the support of host computer 1410. In host computer 1410, an executing host application 1412 may communicate with the executing client application 1432 via OTT connection 1450 terminating at UE 1430 and host computer 1410. In providing the service to the user, client application 1432 may receive request data from host application 1412 and provide user data in response to the request data. OTT connection 1450 may transfer both the request data and the user data. Client application 1432 may interact with the user to generate the user data that it provides.

Figure 14:
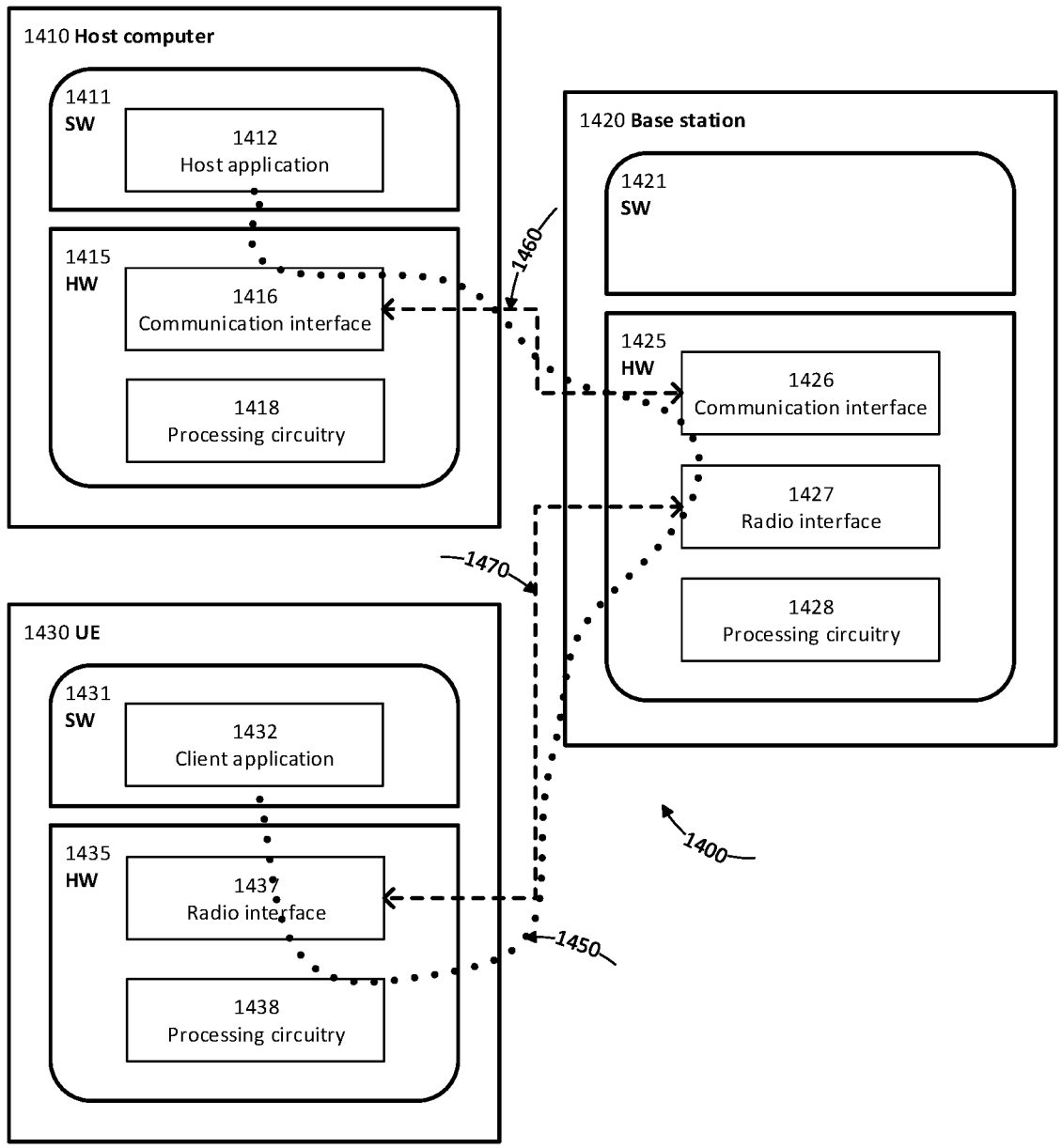
FIG. 14 is a block diagram illustrating a host computer communicating via a base station with a UE over a partially wireless connection in accordance with some embodiments of the present disclosure.

It is noted that host computer 1410, base station 1420 and UE 1430 illustrated in FIG. 14 may be similar or identical to host computer 1030, one of base stations 1012*a*, 1012*b*, 1012c and one of UEs 1091, 1092 of FIG. 13, respectively. This is to say, the inner workings of these entities may be as shown in FIG. 14 and independently, the surrounding network topology may be that of FIG. 13.

In FIG. 14, OTT connection 1450 has been drawn abstractly to illustrate the communication between host computer 1410 and UE 1430 via base station 1420, without explicit reference to any intermediary devices and the precise routing of messages via these devices. Network infrastructure may determine the routing, which it may be configured to hide from UE 1430 or from the service provider operating host computer 1410, or both. While OTT connection 1450 is active, the network infrastructure may further take decisions by which it dynamically changes the routing (e.g., on the basis of load balancing consideration or reconfiguration of the network).

Wireless connection 1470 between UE 1430 and base station 1420 is in accordance with the teachings of the embodiments described throughout this disclosure. One or more of the various embodiments improve the performance of OTT services provided to UE 1430 using OTT connection 1450, in which wireless connection 1470 forms the last segment. More precisely, the teachings of these embodiments may improve the efficiency of the uplink scheduling and reduce the uplink transmission delay, and thereby provide benefits such as high transmission quality and reduced user waiting time.

A measurement procedure may be provided for the purpose of monitoring data rate, latency and other factors on which the one or more embodiments improve. There may further be an optional network functionality for reconfiguring OTT connection 1450 between host computer 1410 and UE 1430, in response to variations in the measurement results. The measurement procedure and/or the network functionality for reconfiguring OTT connection 1450 may be implemented in software 1411 and hardware 1415 of host computer 1410 or in software 1431 and hardware 1435 of UE 1430, or both. In embodiments, sensors (not shown) may be deployed in or in association with communication devices through which OTT connection 1450 passes; the sensors may participate in the measurement procedure by supplying values of the monitored quantities exemplified above, or supplying values of other physical quantities from which software 1411, 1431 may compute or estimate the monitored quantities. The reconfiguring of OTT connection 1450 may include message format, retransmission settings, preferred routing etc.; the reconfiguring need not affect base station 1420, and it may be unknown or imperceptible to base station 1420. Such procedures and functionalities may be known and practiced in the art. In certain embodiments, measurements may involve proprietary UE signaling facilitating host computer 1410's measurements of throughput, propagation times, latency and the like. The measurements may be implemented in that software 1411 and 1431 causes messages to be transmitted, in particular empty or 'dummy' messages, using OTT connection 1450 while it monitors propagation times, errors etc.

Figure 15:
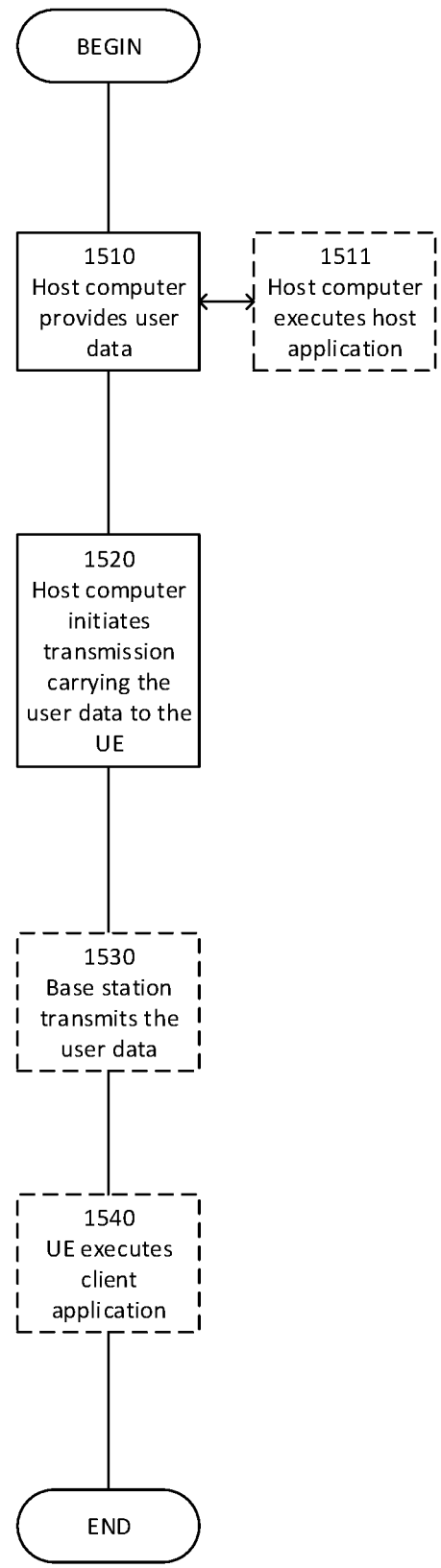
FIG. 15 is a flowchart illustrating a method implemented in a communication system, in accordance with an embodiment of the present disclosure.

FIG. 15 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 15 will be included in this section. In block 1510, the host computer provides user data. In sub-block 1511 (which may be optional) of block 1510, the host computer provides the user data by executing a host application. In block 1520, the host computer initiates a transmission carrying the user data to the UE. In block 1530 (which may be optional), the base station transmits to the UE the user data which was carried in the transmission that the host computer initiated, in accordance with the teachings of the embodiments described throughout this disclosure. In block 1540 (which may also be optional), the UE executes a client application associated with the host application executed by the host computer.

Figure 16:
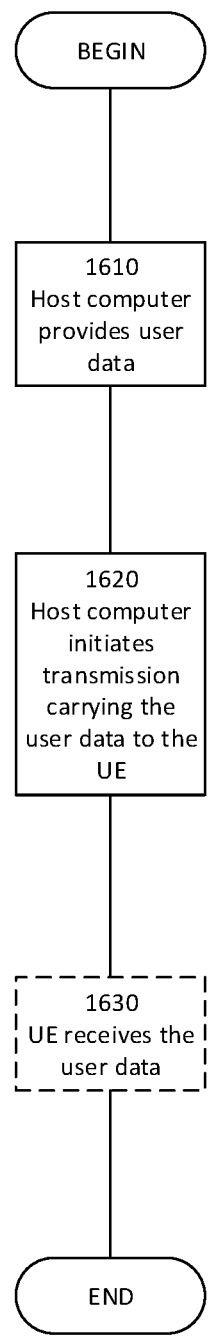
FIG. 16 is a flowchart illustrating a method implemented in a communication system, in accordance with an embodiment of the present disclosure.

FIG. 16 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 16 will be included in this section. In block 1610 of the method, the host computer provides user data. In an optional sub-block (not shown) the host computer provides the user data by executing a host application. In block 1620, the host computer initiates a transmission carrying the user data to the UE. The transmission may pass via the base station, in accordance with the teachings of the embodiments described throughout this disclosure. In step 1630 (which may be optional), the UE receives the user data carried in the transmission.

Figure 17:
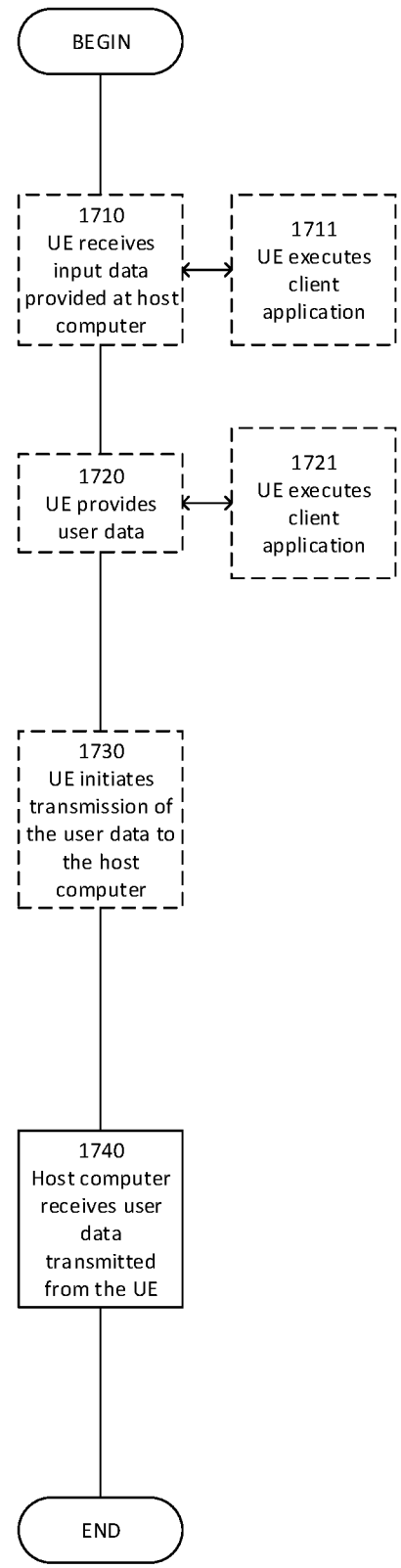
FIG. 17 is a flowchart illustrating a method implemented in a communication system, in accordance with an embodiment of the present disclosure.

FIG. 17 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 17 will be included in this section. In block 1710 (which may be optional), the UE receives input data provided by the host computer. Additionally or alternatively, in block 1720, the UE provides user data. In sub-block 1721 (which may be optional) of block 1720, the UE provides the user data by executing a client application. In sub-block 1711 (which may be optional) of block 1710, the UE executes a client application which provides the user data in reaction to the received input data provided by the host computer. In providing the user data, the executed client application may further consider user input received from the user. Regardless of the specific manner in which the user data was provided, the UE initiates, in sub-block 1730 (which may be optional), transmission of the user data to the host computer. In block 1740 of the method, the host computer receives the user data transmitted from the UE, in accordance with the teachings of the embodiments described throughout this disclosure.

Figure 18:
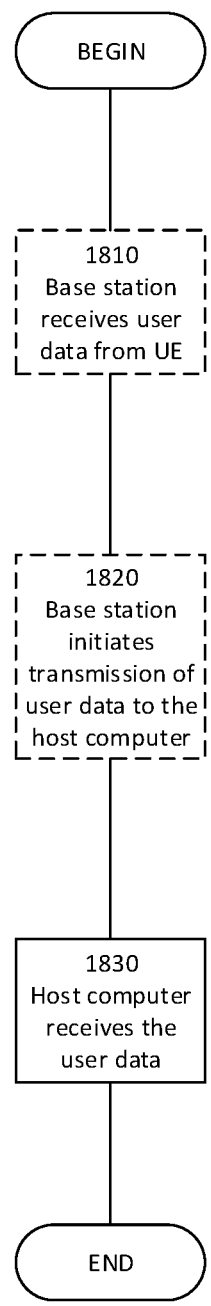
FIG. 18 is a flowchart illustrating a method implemented in a communication system, in accordance with an embodiment of the present disclosure

FIG. 18 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 18 will be included in this section. In block 1810 (which may be optional), in accordance with the teachings of the embodiments described throughout this disclosure, the base station receives user data from the UE. In block 1820 (which may be optional), the base station initiates transmission of the received user data to the host computer. In block 1830 (which may be optional), the host computer receives the user data carried in the transmission initiated by the base station.

Some embodiments of the present disclosure may provide a QoS differentiated ARQ indicator channel (such as PHICH) allocation method which can provide efficient usage of ARQ indicator channel (such as PHICH) resources when multiple levels of QoS are required. In addition, from a UE service point of view, ARQ indicator channel (such as PHICH) transmission performances for high priority QoS level UEs may be improved.

In general, the various exemplary embodiments may be implemented in hardware or special purpose chips, circuits, software, logic or any combination thereof. For example, some aspects may be implemented in hardware, while other aspects may be implemented in firmware or software which may be executed by a controller, microprocessor or other computing device, although the disclosure is not limited thereto. While various aspects of the exemplary embodiments of this disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the disclosure may be practiced in various components such as integrated circuit chips and modules. It should thus be appreciated that the exemplary embodiments of this disclosure may be realized in an apparatus that is embodied as an integrated circuit, where the integrated circuit may comprise circuitry (as well as possibly firmware) for embodying at least one or more of a data processor, a digital signal processor, baseband circuitry and radio frequency circuitry that are configurable so as to operate in accordance with the exemplary embodiments of this disclosure.

It should be appreciated that at least some aspects of the exemplary embodiments of the disclosure may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, random access memory (RAM), etc. As will be appreciated by one of skill in the art, the function of the program modules may be combined or distributed as desired in various embodiments. In addition, the function may be embodied in whole or partly in firmware or hardware equivalents such as integrated circuits, field programmable gate arrays (FPGA), and the like.

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-limiting and exemplary embodiments of this disclosure.

What is claimed is:

1. A method implemented at a network device, comprising:
allocating, based on respective quality of service, QoS, priority of a plurality of terminal devices, respective automatic repeat request, ARQ, indicator channels for the plurality of terminal devices;
transmitting the allocation result to the plurality of terminal devices; and
transmitting respective ARQ indicators on the allocated respective ARQ indicator channels to the plurality of terminal devices,
wherein multiple ARQ indicator channels mapped to a same set of resource elements constitute an ARQ indicator channel group, and allocating, based on respective QoS priority of the plurality of terminal devices, respective ARQ indicator channels for the plurality of terminal devices comprising:
grouping, based on the respective QoS priority of the plurality of terminal devices, the plurality of terminal devices into two or more QoS groups;
determining, based on a number of terminal devices in each QoS group and an expected maximum number of terminal devices in an ARQ indicator channel group for each QoS group, a required total number of ARQ indicator channel groups for the two or more QoS groups; and
performing one of the following three options:
option 1: when the required total number of ARQ indicator channel groups is smaller than a number of ARQ indicator channel groups configured to the network device, allocating respective ARQ indicator channel groups for the two or more QoS groups based on the required total number of ARQ indicator channel groups and then allocating first n QoS group(s) in descending order of the QoS priority with surplus ARQ indicator channel group/groups, wherein n is an integer greater than or equal to 1;
option 2: when the required total number of ARQ indicator channel groups ims equal to the number of ARQ indicator channel groups configured to the network device, allocating the ARQ indicator channel groups for the two or more QoS groups based on the required total number of ARQ indicator channel groups; and
option 3: when the required total number of ARQ indicator channel groups is greater than the number of ARQ indicator channel groups configured to the network device, decreasing the required number of ARQ indicator channel groups for first m QoS group/groups in ascending order of the QoS priority such that the required total number of ARQ indicator channel groups is equal to or smaller than the number of ARQ indicator channel groups configured to the network device, and performing option 1 or 2 based on the decreased required total number of ARQ indicator channel groups, wherein m is an integer greater than or equal to 1.

2. The method according to claim 1, wherein a terminal device with a higher QoS priority is allocated with an ARQ indicator channel configured with less number of ARQ indicators.

3. The method according to claim 1, wherein decreasing the required number of ARQ indicator channel groups for first m QoS group/groups in ascending order of the QoS priority comprises:
increasing the expected maximum number of terminal devices in an ARQ indicator channel group for at least one of the first m QoS group/groups in ascending order of the QoS priority.

4. The method according to claim 1, wherein the expected maximum number of terminal devices in an ARQ indicator channel group for a QoS group with a higher QoS requirement is smaller than the expected maximum number of terminal devices in an ARQ indicator channel group for a QoS group with a lower QoS requirement.

5. The method according to claim 1, wherein the QoS priority of a terminal device is indicated by a QoS class identifier.

6. The method according to claim 1, wherein when a terminal device is associated with two or more QoS priorities, the highest QoS priority is used as the QoS priority of the terminal device.

7. The method according to claim 1, wherein a started allocation ARQ indicator channel group is randomly selected.

8. The method according to claim 1, wherein the ARQ indicator channel is a physical hybrid ARQ indicator channel, PHICH, and the ARQ indicator channel group is a PHICH group.

9. A method implemented at a network device, comprising:
- allocating, based on respective quality of service, QoS, priority of a plurality of terminal devices, respective automatic repeat request, ARQ, indicator channels for the plurality of terminal devices;
- transmitting the allocation result to the plurality of terminal devices; and
- transmitting respective ARQ indicators on the allocated respective ARQ indicator channels to the plurality of terminal devices,
- wherein multiple ARQ indicator channels mapped to a same set of resource elements constitute an ARQ indicator channel group, and allocating, based on respective QoS priority of the plurality of terminal devices, respective ARQ indicator channels for the plurality of terminal devices comprising:
  - grouping, based on the respective QoS priority of the plurality of terminal devices, the plurality of terminal devices into two or more QoS groups;
  - determining, based on a number of terminal devices in each QoS group and an expected maximum number of terminal devices in an ARQ indicator channel group for each QoS group, a required total number of ARQ indicator channel groups for the two or more QoS groups; and
  - when the required total number of ARQ indicator channel groups is smaller than a number of ARQ indicator channel groups configured to the network device, allocating respective ARQ indicator channel groups for the two or more QoS groups based on the required total number of ARQ indicator channel groups and then allocating first n QoS group(s) in descending order of the QoS priority with surplus ARQ indicator channel group/groups, wherein n is an integer greater than or equal to 1.

10. The method according to claim 9, wherein a terminal device with a higher QoS priority is allocated with an ARQ indicator channel configured with less number of ARQ indicators.

11. The method according to claim 9, wherein the expected maximum number of terminal devices in an ARQ indicator channel group for a QoS group with a higher QoS requirement is smaller than the expected maximum number of terminal devices in an ARQ indicator channel group for a QoS group with a lower QoS requirement.

12. The method according to claim 9, wherein the QoS priority of a terminal device is indicated by a QoS class identifier.

13. The method according to claim 9, wherein when a terminal device is associated with two or more QoS priorities, the highest QoS priority is used as the QoS priority of the terminal device.

14. The method according to claim 9, wherein a started allocation ARQ indicator channel group is randomly selected.

15. The method according to claim 9, wherein the ARQ indicator channel is a physical hybrid ARQ indicator channel, PHICH, and the ARQ indicator channel group is a PHICH group.

16. A method implemented at a network device, comprising:
- allocating, based on respective quality of service, QoS, priority of a plurality of terminal devices, respective automatic repeat request, ARQ, indicator channels for the plurality of terminal devices;
- transmitting the allocation result to the plurality of terminal devices; and
- transmitting respective ARQ indicators on the allocated respective ARQ indicator channels to the plurality of terminal devices,
- wherein multiple ARQ indicator channels mapped to a same set of resource elements constitute an ARQ indicator channel group, and allocating, based on respective QoS priority of the plurality of terminal devices, respective ARQ indicator channels for the plurality of terminal devices comprising:
  - grouping, based on the respective QoS priority of the plurality of terminal devices, the plurality of terminal devices into two or more QoS groups;
  - determining, based on a number of terminal devices in each QoS group and an expected maximum number of terminal devices in an ARQ indicator channel group for each QoS group, a required total number of ARQ indicator channel groups for the two or more QoS groups; and
  - when the required total number of ARQ indicator channel groups is greater than the number of ARQ indicator channel groups configured to the network device, decreasing the required number of ARQ indicator channel groups for first m QoS group/groups in ascending order of the QoS priority such that the required total number of ARQ indicator channel groups is equal to or smaller than the number of ARQ indicator channel groups configured to the network device, and performing option 1 or 2 based on the decreased required total number of ARQ indicator channel groups, wherein m is an integer greater than or equal to 1.

17. The method according to claim 16, wherein decreasing the required number of ARQ indicator channel groups for first m QoS group/groups in ascending order of the QoS priority comprises:
- increasing the expected maximum number of terminal devices in an ARQ indicator channel group for at least one of the first m QoS group/groups in ascending order of the QoS priority.

18. The method according to claim 16, wherein the expected maximum number of terminal devices in an ARQ indicator channel group for a QoS group with a higher QoS requirement is smaller than the expected maximum number of terminal devices in an ARQ indicator channel group for a QoS group with a lower QoS requirement.

19. A method implemented at a network device, comprising:
- allocating, based on respective quality of service, QoS, priority of a plurality of terminal devices, respective automatic repeat request, ARQ, indicator channels for the plurality of terminal devices;

transmitting the allocation result to the plurality of terminal devices; and transmitting respective ARQ indicators on the allocated respective ARQ indicator channels to the plurality of terminal devices, wherein multiple ARQ indicator channels mapped to a same set of resource elements constitute an ARQ indicator channel group, and allocating, based on respective QoS priority of the plurality of terminal devices, respective ARQ indicator channels for the plurality of terminal devices comprising:

grouping, based on the respective QoS priority of the plurality of terminal devices, the plurality of terminal devices into two or more QoS groups;

determining, based on a number of terminal devices in each QoS group and an expected maximum number of terminal devices in an ARQ indicator channel group for each QoS group, a required total number of ARQ indicator channel groups for the two or more QoS groups; and when the required total number of ARQ indicator channel groups ims equal to the number of ARQ indicator channel groups configured to the network device, allocating the ARQ indicator channel groups for the two or more QoS groups based on the required total number of ARQ indicator channel groups.

20. The method according to claim 19, wherein the expected maximum number of terminal devices in an ARQ indicator channel group for a QoS group with a higher QoS requirement is smaller than the expected maximum number of terminal devices in an ARQ indicator channel group for a QoS group with a lower QoS requirement.

* * * * *